H. Y. WILSON.
VAPOR BATH CABINET.
APPLICATION FILED OCT. 12, 1914.
1,128,564.
Patented Feb. 16, 1915.
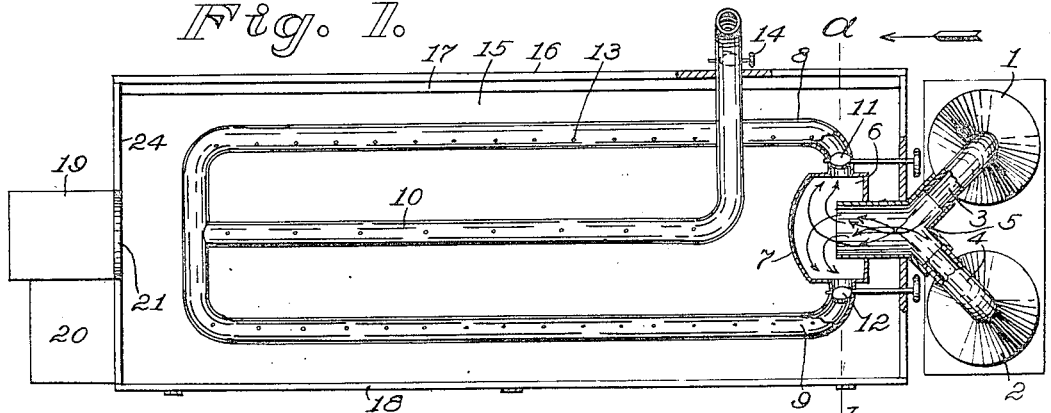
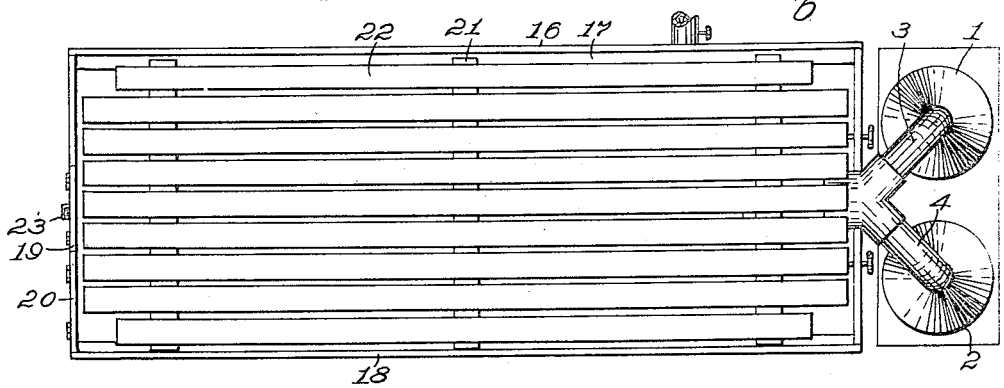
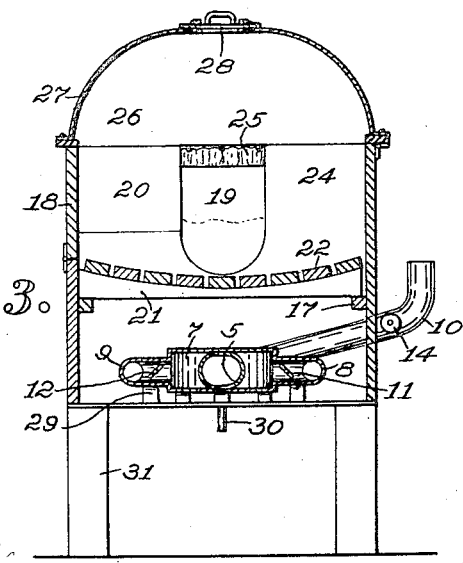
Witnesses:
Pearl Stanton
Genevieve Wilhelm
Inventor,
H. Y. Wilson, by
J. C. Kennedy.
Attorney.

UNITED STATES PATENT OFFICE.

HARVEY Y. WILSON, OF WATERLOO, IOWA, ASSIGNOR OF ONE-HALF TO JULIUS C. JOHNSON, OF SOUTH MINNEAPOLIS, MINNESOTA.

VAPOR-BATH CABINET.

1,128,564.   Specification of Letters Patent.   Patented Feb. 16, 1915.

Application filed October 12, 1914. Serial No. 866,263.

*To all whom it may concern:*

Be it known that I, HARVEY Y. WILSON, a citizen of the United States of America, and a resident of Waterloo, Blackhawk county, Iowa, have invented certain new and useful Improvements in Vapor-Bath Cabinets, of which the following is a specification.

My invention relates to improvements in vapor-bath cabinets, and the object of my improvement is to provide for such a cabinet inclosed means for thoroughly mixing and distributing fluids derived from independent sources of supply. This object I have accomplished by the means which are hereinafter described and claimed, and which are illustrated in the accompanying drawings, in which:

Figure 1 is an upper plan view of my improved vapor-bath cabinet, with the cover and inner rack thereof removed, and parts broken away to better disclose the interior construction. Fig. 2 is an upper plan view of said cabinet with the cover only removed, the inner rack in place. Fig. 3 is a vertical transverse section of the cabinet and its contents, including the hinged cover therefor, the casing part and its contents being sectioned on the line *a—b* of said Fig. 1 and looking in the direction of the arrow.

Similar numerals of reference denote corresponding parts throughout the several views.

The casing 16 is provided with a hinged arched closure 27, and is supported on the legs 31. The small opening in said closure has a sliding cover 28 to permit the condition of the interior vapor and temperature to be examined when desired. Shelves 17 are secured along the inner longitudinal walls of the casing 16 at a distance above its bottom 15. The cross pieces 21 of the substantially horizontal rack made up of the spaced longitudinal slats 22 are seated removably on said shelves. At one end 24 of the casing, a part is cut away from the upper edge thereof down as far as said rack to permit of a patient's head passing therethrough to rest on a hinged and bracketed shelf 19 on the outside of the casing. The end 24 is cut away at one side to provide an opening communicating with said other opening when the hinged flap part of said end is swung outwardly. The upper part 18 of the one side wall of said casing is hinged thereto to swing outwardly, and the hinged parts 18 and 20 may be moved outwardly for the convenience of the patient in entering the casing. When the hinged shelf 19 is closed up against the end 24 of the casing, a small opening is left, which, however, is covered by means of a depending curtain 25. Underneath the rack 22 in said casing, and supported on legs 29 resting on the bottom 15 is a mixing and distributing device for vapor. This device is composed of a mixing chamber 7 with branching conduits 8 and 9 extending from opposite sides thereof, then bent around to extend parallel with the inner longitudinal walls of the casing, and then bent again to be united at their left-hand ends. An exhaust pipe 10 leads from the middle of the cross connection of said pipes, extending longitudinally down the middle of the casing and then is angularly bent to pass through the wall of the casing, the outer end being provided with a stop-cock 14.

The mixing chamber 7 is located in the right hand end of the casing, its left-hand wall 7 being arched. The interior 6 of said chamber is in communication with receptacles 1 and 2 without the casing by means of the elbows 3 and 4, respectively, which pass into a Y-coupling 4. The main part of said coupling extends through the wall of said casing to have its open end seated inside of said chamber 6 medially, and so as to partially cross the interspace between the openings into the pipes 8 and 9. Stop-cocks 11 and 12 are seated in said pipes adjacent to said mixing chamber.

The receptacle 1 may be in the form of a conical funnel open at the bottom and placed over a gas flame or some other heating means adapted to create a current of hot air to pass up into said funnel and through the elbow 3, and the Y 4 into the mixing chamber 6. The receptacle 2 may be formed to receive a quantity of water, which may be medicated if desired, said receptacle being placed over a gas flame or other heating means. Vapor passes through the elbow 5 and said Y 4 into the mixing chamber 6. Referring to Fig. 1, the arrows indicate the manner in which the respective hot air and vapor currents meet at an angle in said Y and become partially mixed together there. The mingled fluids then pass against the arched left-hand wall 7 of the chamber 6 and are further mixed before passing into the pipes 8 and 9. Since the left-hand end of said Y extends partially through the chamber 6, the mingling currents of hot air and vapor are baffled thereby and prevented from moving more directly into the pipes 8 and 9. The mingled fluids issue from the small openings 13 in the conduits 8, 9 and 10 and fill the interior of the cabinet with a medicated heated vapor enveloping the patient who inclines upon the rack 22, with his or her head passed without the casing through the opening 21 to rest upon the bracketed shelf 19. The proportions of hot air and vapor in said pipes may be regulated or varied as desired by means of the stop cocks 11 and 12. Any condensed moisture upon the bottom 15 will drain off through an outlet tube 30.

Having described my invention, what I claim as new, and desire to secure by Letters Patent, is:

1. In a vapor-bath cabinet, a mixing device, said mixing device comprising primary and secondary mixing chambers, the primary chamber being in communication with independent sources of supply and extending and opening into said secondary chamber, said secondary chamber communicating with the interior of the cabinet out of line with the said delivery-openings of the primary chamber.

2. In a vapor-bath cabinet, a mixing device, said mixing device comprising primary and secondary mixing chambers, converging conduits extending from independent sources of supply and entering said primary chamber at their junction point, the primary chamber having an open delivery end extending into the central part of said secondary chamber, and said secondary chamber having delivery-openings at its opposite ends at places out of line and set back relatively to the delivery end of said primary chamber to produce interrupted paths between said delivery end and said delivery openings.

3. In a vapor-bath cabinet, a casing, a loop shaped conduit therein having a plurality of relatively small orifices therealong, a mixing chamber included in said loop and in communication therewith at opposite sides, and a tube passed into said chamber medially and interruptedly with relation to the communications of the chamber with said loop, said tube being in communication with independent sources of supply.

4. In a vapor-bath cabinet, a casing, a loop shaped conduit therein, an exhaust pipe leading from one end of said conduit through said casing, a mixing chamber communicating on opposite sides with the oppositely located parts of said loop, said conduit having small perforations therealong, and a tube projected into said mixing chamber medially partially across the openings of the conduit ends into the chamber to baffle and mix fluids in the chamber before their passage into said conduit.

5. In a vapor-bath cabinet, a casing, a mixing chamber therein, a tube extended into the chamber beyond the inner wall thereof, pipes leading from opposite ends of said chamber and having longitudinally alined orifices, said tube passing across and baffling the passage of fluids into said orifices, and means for controlling the flow of a fluid from said mixing chamber through said pipes.

6. In a vapor-bath cabinet, a casing, and vapor distributing means located in said casing, comprising a U-shaped tube arranged horizontally near the inner walls of the casing, a mixing chamber into whose opposite sides the ends of said tube open, said tube having relatively small orifices therealong, said mixing-chamber being wider than said tube and being in communication with a forked conduit, the conduit passing into the chamber past the open ends of said tube, which forks lead to independent sources of supply, an exhaust-pipe extending from the middle of the cross connection of the U-shaped pipe through said casing, and means for controlling the flow of mingled fluids in said U-shaped pipe and said exhaust-pipe.

7. In a vapor-bath cabinet, an endless conduit in the form of a lengthened approximately horizontal loop having a plurality of small orifices therealong, said loop including at the middle of one of its shorter parts a widened part of substantially rectangular form with the conduit entering the middles of its opposite walls, and a tube passed into the outer end wall of the widened part to extend past the conduit openings.

8. In a vapor-bath cabinet, an endless conduit in the form of a lengthened approximately horizontal loop having a plurality of small orifices therealong, said loop including at the middle of one of its shorter parts a widened part forming a substantially rectangular chamber having its inner end wall made convex outwardly, and a tube projected through the outer end wall of said chamber medially to pass the line of openings thereinto of said conduit to baffle different fluids introduced thereby, and mix them by delivering them against said convex wall before their entry into both conduit openings.

Signed at Waterloo, Iowa, this 24th day of Sept. 1914.

HARVEY Y. WILSON.

Witnesses:
W. H. BRUNN,
G. C. KENNEDY.